United States Patent [19]

Sagnes et al.

[11] Patent Number: 5,304,335
[45] Date of Patent: Apr. 19, 1994

[54] METHOD FOR THE OBTAINING OF POLYMERS WITH THERMALLY STABLE CONDUCTIVITY

[75] Inventors: Olivier Sagnes, Corbreuse; Philippe Michel, Paris, both of France

[73] Assignee: Thomson-CSF, Puteaux, France

[21] Appl. No.: 836,852

[22] Filed: Feb. 19, 1992

[30] Foreign Application Priority Data

Feb. 19, 1991 [FR] France ............................. 91 01931

[51] Int. Cl.$^5$ ............................................. H01B 1/00
[52] U.S. Cl. ..................................... 252/500; 252/518; 525/535; 528/422; 528/423; 528/487; 526/258
[58] Field of Search ................ 252/500, 518; 525/535, 525/540; 528/422, 423, 487, 488; 526/258

[56] References Cited

U.S. PATENT DOCUMENTS

| | | | |
|---|---|---|---|
| 4,696,835 | 9/1987 | Maus et al. | 252/500 |
| 4,697,000 | 9/1987 | Witucki et al. | 252/500 |
| 4,697,001 | 9/1987 | Walker et al. | 252/500 |
| 4,803,096 | 2/1989 | Kuhn et al. | 252/500 |

FOREIGN PATENT DOCUMENTS 0349105 1/1990 European Pat. Off. .
0352882 1/1990 European Pat. Off. .

OTHER PUBLICATIONS

Database Derwent World Patent Index, AN 87-132560 & JP-A 62072715, "Conducting Film Preparation Forming Polyolefin Diaphragm Contact Aqueous Heterocycle Compounds Solution Contain Surfactant ..." Apr. 3, 1987.

Primary Examiner—Paul Lieberman
Assistant Examiner—M. Kopec
Attorney, Agent, or Firm—Oblon, Spivak, McClelland, Maier & Neustadt

[57] ABSTRACT

Disclosed is a novel method for obtaining conductive polymers enabling their conductive to be increased and thermally stabilized. The polymers are obtained by oxidative chemical process in the presence of a codopant, the anions of which are more stable than the oxidating anions. The synthesis of the polymer is furthermore followed by a thermal treatment operation by which the conductivity of the material obtained is stabilized. Application: microwave absorbents.

8 Claims, 3 Drawing Sheets

METHOD FOR THE OBTAINING OF POLYMERS WITH THERMALLY STABLE CONDUCTIVITY

BACKGROUND OF THE INVENTION

1. Field of the Invention

The present invention relates to a new method for obtaining conductive polymers that can be used to increase their conductivity and make it thermally stable.

The obtaining of high thermal stability then makes it possible to use such polymers for industrial purposes since their use generally necessitates steps in which a heating operation most usually leads to a decrease in their conduction.

2. Description of the Prior Art

At present, conductive polymers are obtained by several methods of synthesis.

The electrochemical method has been the one most studied since it can be used to synthesize polymers that perform well, but this type of synthesis generally results in the obtaining of a film and not a powder. The level of efficiency and the quantities inherent in this method of synthesis means that it is difficult to exploit it for industrial purposes. More precisely, the electrochemical method consists of an electropolymerization during which the polymer develops on an electrode and is made conductive by the insertion of ion species that stabilize the conduction. This mode of synthesis enables a great variety of polymerization both at the monomer level (pyrrole, thiophene, aniline, indole etc) and at the level of stabilizing species.

During the process of growth of the polymer on the anode, the oxidizing of the polymer leads to the creation of an electron defect (p type conduction). In the case of pyrrole, for example, this error is of the order of one hole for three heterocyclic structures.

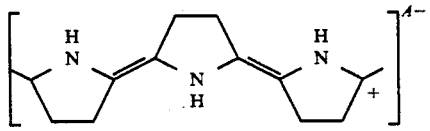

The electrolyte A present gets dissociated and stabilizes the p type conduction, in forming a complex on the chain. The heat stability of the conduction of the conductive polymer then results mainly from the stability of the fixing of the anion.

The best results have been obtained on crude conductive polymer by means of paratoluene sulfonate, phenylsulfonate, alkylfluorosulfonate anions as compared with anions of low steric hindrance such as $BF_4^-$, $PF_6^-$, $ClO_4^-$. Furthermore, it would appear that the group $RSO_3$ has an electronegative potential greater than that of the anions $BF_4^-$, $PF_6^-$, $ClO_4^-$ or $RCOO^-$: this furthers its quality of gripping in the polymer matrix.

At the same as the studies on the electrochemical method, work is being done on oxidative polymerization. This type of purely chemical synthesis brings a redox pair into play and enables the making of a conductive powder with submicronic sizes (1 μm to 0.1 μm), and achieves this result with excellent efficiency.

The reaction process generally brings together an oxidizing agent of the $FeCl_3$, $Fe(NO_3)_3$ or $CuCl_2$ type, which will get reduced in the presence of a monomer.

Having been oxidized, the monomer gets polymerized in short chains (20 to 50 monomer units). The anion provided by the oxidizing agent behaves similarly to the anion of the electrolysis. For example, in the pair formed by pyrrole and ferric chloride, the oxidation-reduction reaction is as follows:

and

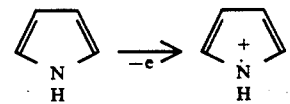

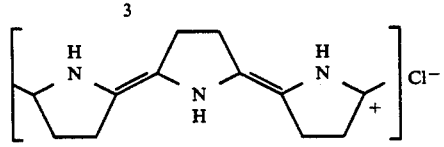

The chain thus synthesized therefore has anions of low hindrance and low electronegativity. The semiconductor powders are not very stable thermally and in relation to the oxidation. For example, polypyrrole powders cannot withstand being heated to more than 80° C. for some hours. Their conductivity drops to below $10^{-3}$ s/cm, the threshold below which the process of elimination by diffusion of the anions becomes slower. This is also the case for polyaniline towards 120° C.

SUMMARY OF THE INVENTION

Since synthesis by a chemical method shows great promise in giving powders that can be used in processes of plastic technology and can be mixed with other bonder polymers, the present invention proposes a new method for obtaining conductive polymers that uses this chemical method while at the same time notably improving conductivity and its thermal stability.

This method comprises the introduction of electrochemically stable anions (cited in the description of synthesis by the electrochemical method), the low hindrance anions related to the oxidizing agent (for example the $Cl^-$ ions) being partially replaced by those with great hindrance such as the ones used in electropolymerization.

This new method therefore includes a first step of synthesis that is carried out in the presence of a monomer, an oxidizing salt and, in addition, a codopant salt having electrochemically stable anions. To provide thermal stability, the polymer thus obtained is heated to a temperature corresponding to the departure of the unstable anions from the oxidizing agent. The conductive polymer thus obtained henceforth contains only the stabilizing anions of the codopant in its matrix.

BRIEF DESCRIPTION OF THE DRAWINGS

The present invention will be understood more clearly and its other advantages shall appear from the following description, given on a non-restrictive basis, and from the appended figures, of which.

DETAILED DESCRIPTION OF THE INVENTION

Figure 1:
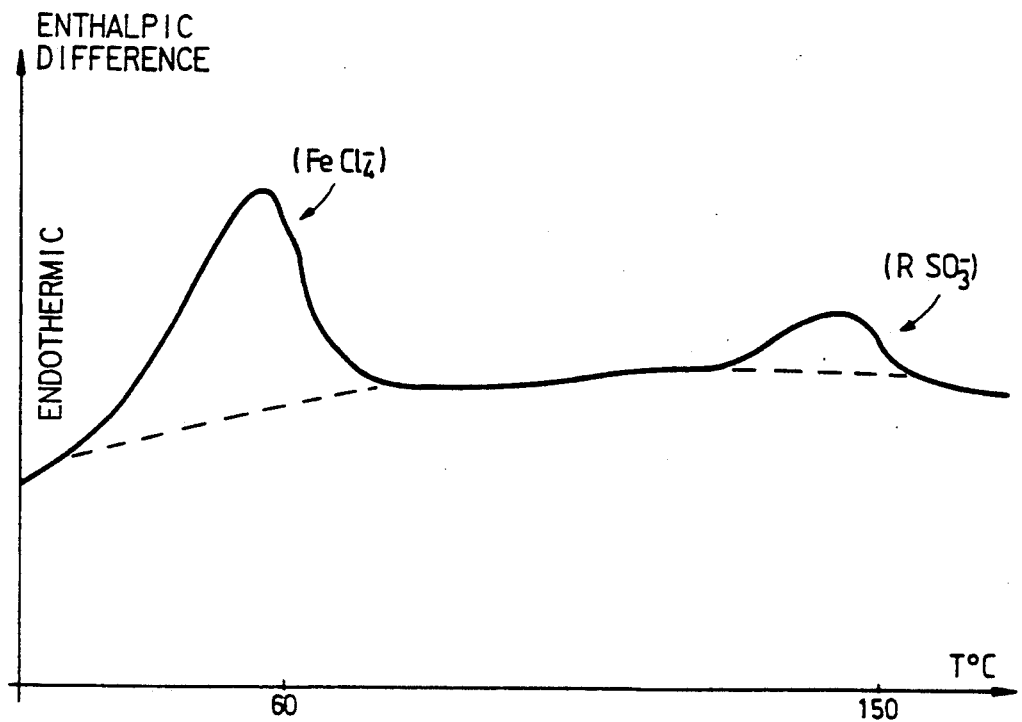
FIG. 1 shows the spectrum, in differential scanning calorimetry, of a codoped polymer powder.

In the synthesis according to the method of the invention, the monomer is polymerized by the action of a standard oxidizing salt. It is preferably a transition metal salt.

During the oxidation reaction, a p type electron defect appears at the level of the monomer units. This defect is stabilized by the anion of the oxidizing salt.

For example, during the synthesis of polypyrrole in the presence of iron chloride $FeCl_3$, the three monomers are stabilized by a $Cl^-$ ion. Analyses have shown that, in reality, the stabilizing anion is $FeCl^-$. These anions are not, however, very stable for they tend to diffuse and escape from the polymer matrix. This is why the method according to the invention proposes the addition of a codopant salt to the monomer and to its polymerization triggering oxidizing agent. This codopant salt is preferably a quaternary ammonium salt or a sodium salt.

It is not responsible for the polymerization but, being present in the polymer network formed, it takes the place of the anions of the oxidizing salt when these unstable anions are exuded from the network. The pair formed by the oxidizing agent and the codopant agent can be used to obtain a conductive polymer, the conductivity of which is stabilized by the presence of the codopant anion which, by its nature, has a greater volume than that of the existing oxidizing anions. The codopant anion trapped in the matrix stabilizes the electron defects and is more heavily trapped in the matrix by virtue of its volume and is therefore diffused out of the matrix with far greater difficulty.

During the synthesis, an excess proportion of codopant agent is introduced into the reaction medium. During the heat treatment that succeeds the synthesis, when the temperature chosen is such that there is a departure of oxidizing anions, the codopant anions may compensate for the departure of these oxidizing anions.

This is why the codopant salts are chosen as a function of the possibilities of synthesis, the size of the anion and its electronegativity. In view of the promise shown by the sulfonate ions in electrochemical synthesis, the quaternary ammonium anions or sodium anions may be alkylsulfonates or alkylbenzenic sulfonates or $CF_3(CF_2)_nSO_3^-$ or else again naphthylsulfonates.

The radical sulfonate is not chosen from among the macromolecules to avoid the obtaining of an anion of excessive volume which may cause an exaggerated deformation of the network and disturb the conductivity of the material. Indeed, the resultant conductivity is due not only to the polymeric intrachain conduction but also to the polymeric interchain conduction which would be hindered if the chains were to be at too great a distance from one another.

To validate these concepts, several syntheses have been made with codopant salts of a nature that is different, in terms of variable mole percentages, from the oxidizing salt. The conductivity of the synthesis products thus obtained has been studied in temperature and in time to analyze the phenomena of decrease of the conduction of these conductive polymers.

EXAMPLE A

This is the synthesis of polypyrrole in the presence of iron chloride. Several codopants have been experimented with.

1. Tetraethylammonium toluenesulfonate (marked Ts)
2. Tetraethylammonium heptadecafluorooctanesulfonate (marked F sulfo)

The cation of the codopant salt may, without distinction, be either quaternary ammonium or sodium, the results obtained being identical.

Several periods of synthesis have been experimented with (18 hours and 20 hours). It turns out that beyond 4 to 6 hours of reaction, the reaction rates are very low.

The use of salts of having a nature 1 or nature 2 induces the synthesis of two different powders. The first (Ts) is a fine powder that is easy to disperse, the second (F sulfo) is viscous and less easy to handle. However, both these two powders lead to a conductivity greater than that obtained in the absence of a codopant (Table I).

TABLE I

| [Codopant]/[oxidizing agent] | 0 | [Ts]/[FeCl$_3$] | [Fsulfo]/[TeCl$_3$] |
|---|---|---|---|
| T(s/cm) | 1,15 | 4,78 | 2,9 |

These are measurements of surface conductivity made by the method wherein four equidistant probe tips are used. They are made on powders pressed in identical conditions (namely mass of conductive polymer, pressure, duration and mold).

Figure 2:
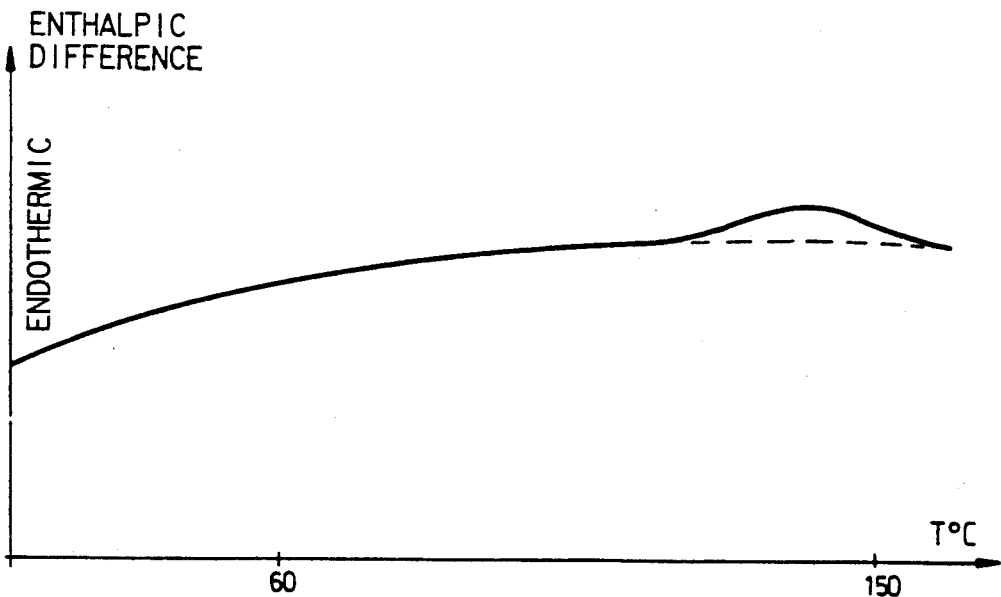
FIG. 2 shows the spectrum, in differential scanning calorimetry, of a codoped polymer powder already heated to 150° C.

Furthermore, the thermal behaviour of a powder obtained from an oxidizing salt $FeCl_3$ and a codopant salt (ts) has been studied in order to arrive at a better understanding of the changes in conductivity as a function of the time and the temperature. By differential scanning calorimetry on a sample with a codopant salt Ts, two endothermic broad peaks are obtained, one between 60° C. and 50° C. corresponding to the eviction of the $FeCl_4^-$ ions and a second one towards 150° C. characteristic of the presence of the tosylate ions (FIG. 1). Since the sample then undergoes a second thermal cycle, it thereafter displays only one high temperature broad peak relating to the remaining tolylate ions (FIG. 2). The phenomenon of diffusion of the codopant ions is sufficiently slow to keep a characteristic rate.

EXAMPLE B

Polypyrrole has been synthesized in the presence of $FeCl_3$ and of different mole percentages of (Ts).

Figure 3:
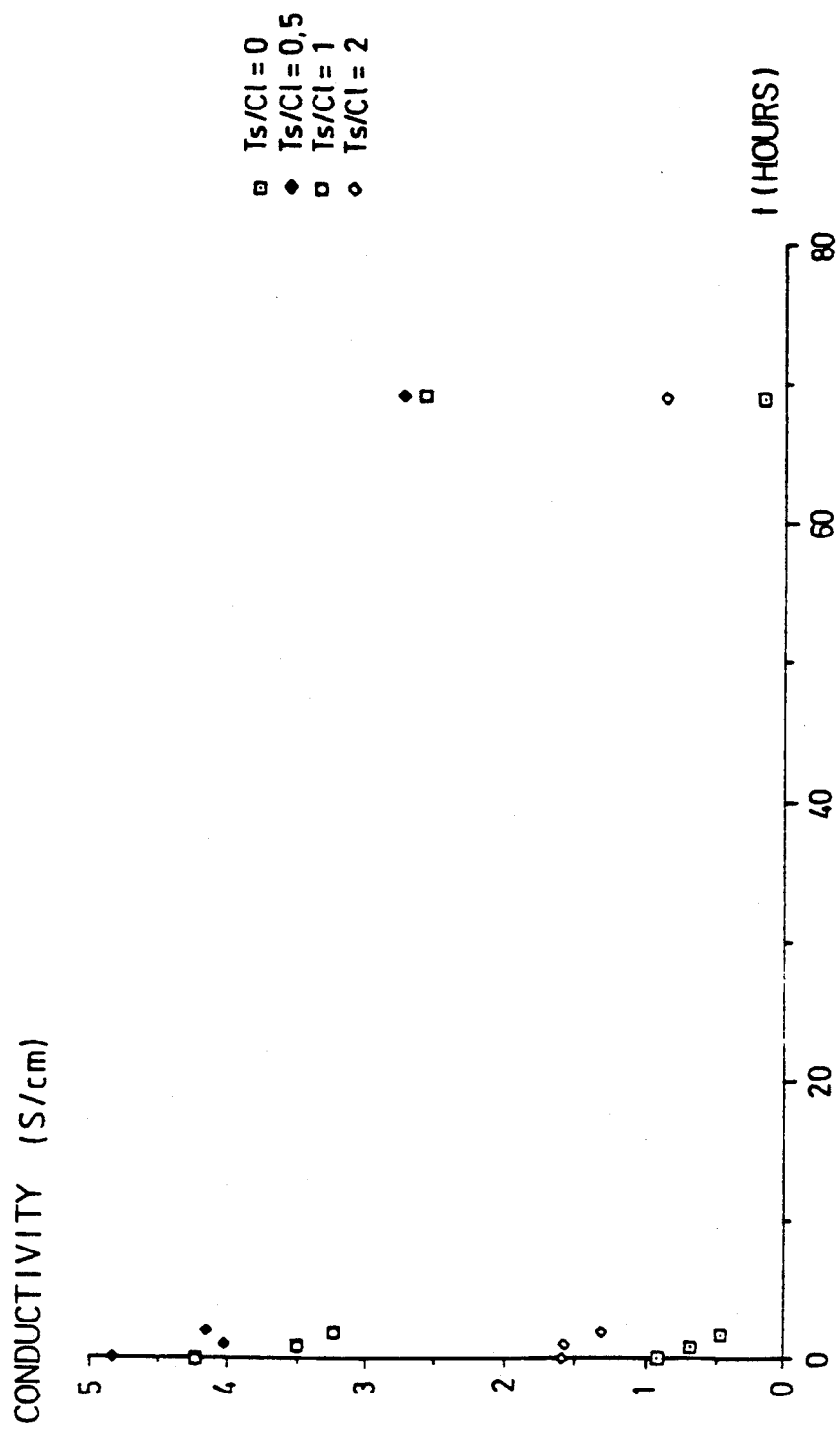
FIG. 3 shows the changes in conductivity with time, at 60° C. for different mole ratios (codopant)/(oxidant)

FIG. 3 shows that there is an optimum ratio ranging from 0.5 to 1 for the mole ratio (Ts)/FeCl$_3$.

The study in time has been done at 60° C. to illustrate the phenomena of decrease in conductivity. At this temperature, the decrease is about 40% in the presence of toluenesulfonate whereas it reaches 90% without a codopant agent. Furthermore, beyond 40 hours, the deterioration recorded in the presence of Ts gets stabilized whereas, in the absence of toluene sulfonate, the deterioration of the conductivity tends towards a zero value.

Figure 4:
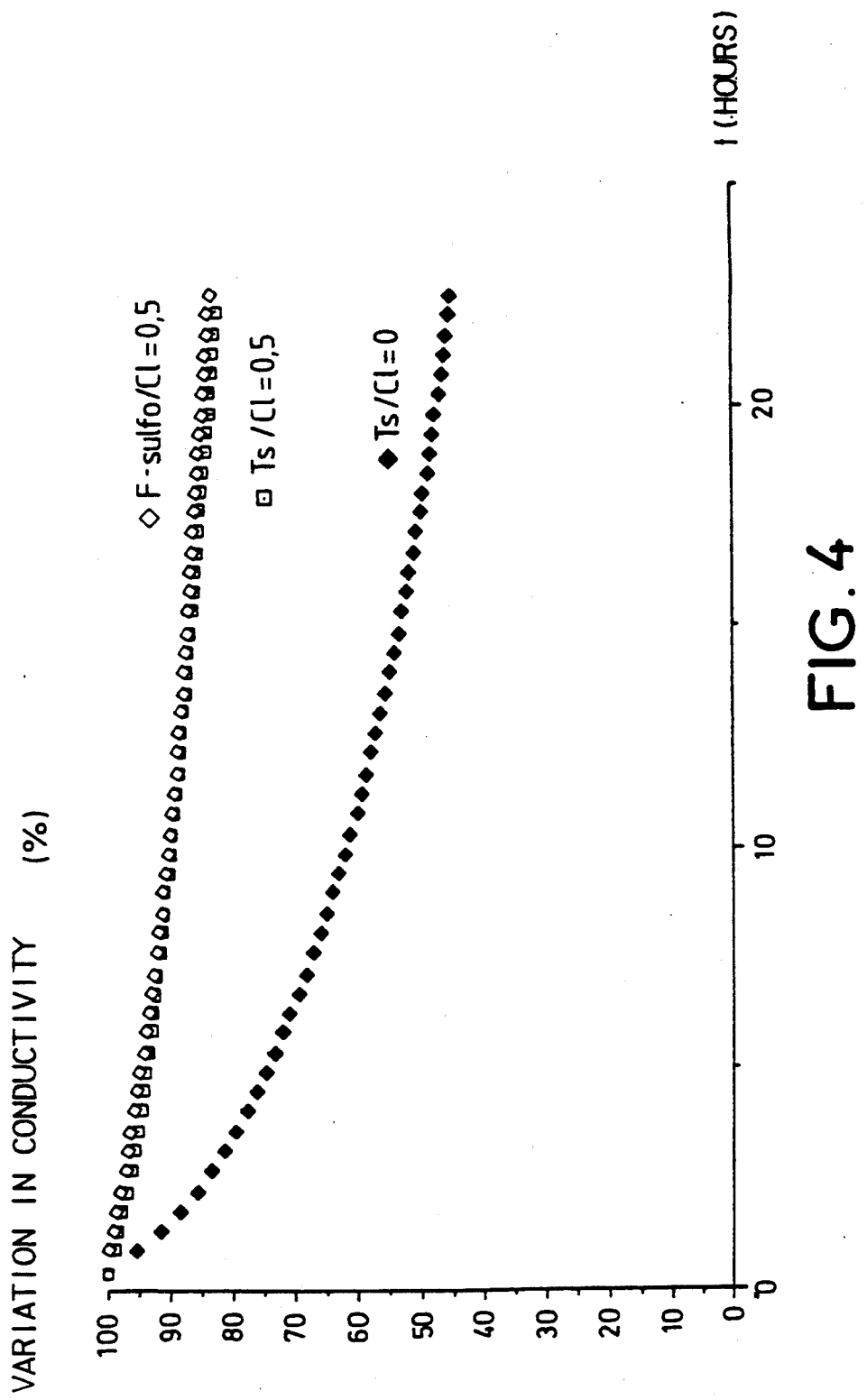
FIG. 4 shows the changes in conductivity with time at 60° C., for different codopant anions.

Similar behavior is observed when the synthesis of polypyrrole is done in the presence of FeCl₃ and (F sulfo) (FIG. 4).

The thermal treatment done in the region of 60° C., a temperature corresponding to the eviction of the $FeCl_4^-$ ions from the polymer matrix, can be used to obtain a conductive polymer with conductivity that is far more stable in time, this being achieved for temperatures going beyond 60° C.

What is claimed is:

1. A method for obtaining a conductive polymer which exhibits a stabilized and increased conductivity, consisting of the steps of:

chemically polymerizing a monomer which forms said conductive polymer in the presence of an oxidizing salt and a codopant salt, said oxidizing salt initiating the polymerization reaction and said codopant salt not being responsible for polymerization but being responsible for stabilizing electron defects in the conductive polymer obtained; and thermally treating the conductive polymer obtained which contains oxidizing anions from said oxidizing salt and codopant anions from said codopant salt at a temperature which expels oxidizing ions from the polymer matrix, but lower than the temperature at which codopant anions would be expelled from the polymer matrix.

2. The method of claim 1, wherein the monomer is a heterocycle compound, a derivative of said heterocyclic compound, aniline or a derivative of aniline.

3. The method of claim 2, wherein said heterocyclic compound is thiophene, pyrrole or indole.

4. The method of claim 1, wherein the oxidizing salt is a transition metal salt.

5. The method of claim 4, wherein the transition metal salt is $FeCl_3 \cdot 6H_2O$.

6. The method of any one of claims 2 to 4, wherein the codopant salt is a quaternary ammonium salt or a sodium salt.

7. The method of claim 6, wherein the anion of the quaternary ammonium salt is an alkyl sulfonate, an alkyl benzenesulfonate, $CF_3(CF_2)_nSO_3^-$ or a naphthylsulfonate.

8. The method of claim 1, wherein the mole ratio of codopant salt to oxidizing salt is about 0.5.

* * * * *